United States Patent
Masutani et al.

(10) Patent No.: US 7,643,113 B2
(45) Date of Patent: Jan. 5, 2010

(54) TRANSFLECTIVE LIQUID CRYSTAL DISPLAY DEVICE AND METHOD FOR MANUFACTURING THE SAME

(75) Inventors: Yuichi Masutani, Tokyo (JP); Shingo Nagano, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 227 days.

(21) Appl. No.: 11/219,879

(22) Filed: Sep. 7, 2005

(65) Prior Publication Data
US 2006/0050213 A1    Mar. 9, 2006

(30) Foreign Application Priority Data
Sep. 8, 2004    (JP) .............................. 2004-260873

(51) Int. Cl.
*G02F 1/1335* (2006.01)
(52) U.S. Cl. ......................................... 349/114; 349/42
(58) Field of Classification Search ........................ None
See application file for complete search history.

(56) References Cited

U.S. PATENT DOCUMENTS

| | | | | |
|---|---|---|---|---|
| 5,051,800 | A * | 9/1991 | Shoji et al. .................. | 257/290 |
| 5,416,619 | A | 5/1995 | Koike | |
| 6,195,140 | B1 | 2/2001 | Kubo et al. | |
| 6,833,883 | B2 | 12/2004 | Park et al. | |
| 2002/0033918 | A1 | 3/2002 | Shigeno et al. | |
| 2002/0105614 | A1* | 8/2002 | Nakayama et al. ........... | 349/143 |
| 2003/0123001 | A1* | 7/2003 | Ha et al. ..................... | 349/113 |
| 2004/0179156 | A1* | 9/2004 | Sah et al. .................... | 349/114 |

FOREIGN PATENT DOCUMENTS

| | | |
|---|---|---|
| JP | 7-230101 A | 8/1995 |
| JP | 11-212119 | 8/1999 |

(Continued)

OTHER PUBLICATIONS

Official Action issued by the Korean Patent Office on Oct. 27, 2007, in corresponding Korean Patent Application No. 10-2005-0082096, and English-language translation thereof.

(Continued)

*Primary Examiner*—David Nelms
*Assistant Examiner*—Lucy P Chien
(74) *Attorney, Agent, or Firm*—Buchanan Ingersoll & Rooney PC

(57) ABSTRACT

A transflective liquid crystal display device in which a transmissive area to transmit light to a pixel area and a reflective area as well as a thin film transistor are arranged on an insulating substrate, includes an TFT array substrate having plural gate wirings each provided with a gate electrode and a storage capacitive wiring provided with a storage capacitive electrode made of a first conductive film, plural source wirings each provided with a source electrode and a drain electrode made of a second conductive film, a reflecting pixel electrode extending from the drain electrode, and a transmissive pixel electrode formed through a second insulating film, and an opposite substrate arranged oppositely to the TFT array substrate. The source wirings and the reflecting pixel electrode are arranged apart from each other by a predetermined interval, and a contrast preventing electrode is formed over the interval on the second insulating film.

6 Claims, 7 Drawing Sheets

FOREIGN PATENT DOCUMENTS

| | | |
|---|---|---|
| JP | 2000-19563 | 1/2000 |
| JP | 2000-258802 | 9/2000 |
| JP | 2001-350158 | 12/2001 |
| JP | 2003-195329 | 7/2003 |
| JP | 2004-110299 | 4/2004 |
| JP | 2004-163461 | 6/2004 |
| KR | 2002-0037891 A | 5/2002 |
| KR | 2002-0091897 A | 12/2002 |

OTHER PUBLICATIONS

Taiwanese Office Action in corresponding Application No. 09820231100 dated Apr. 22, 2009, and an English Translation thereof.

* cited by examiner

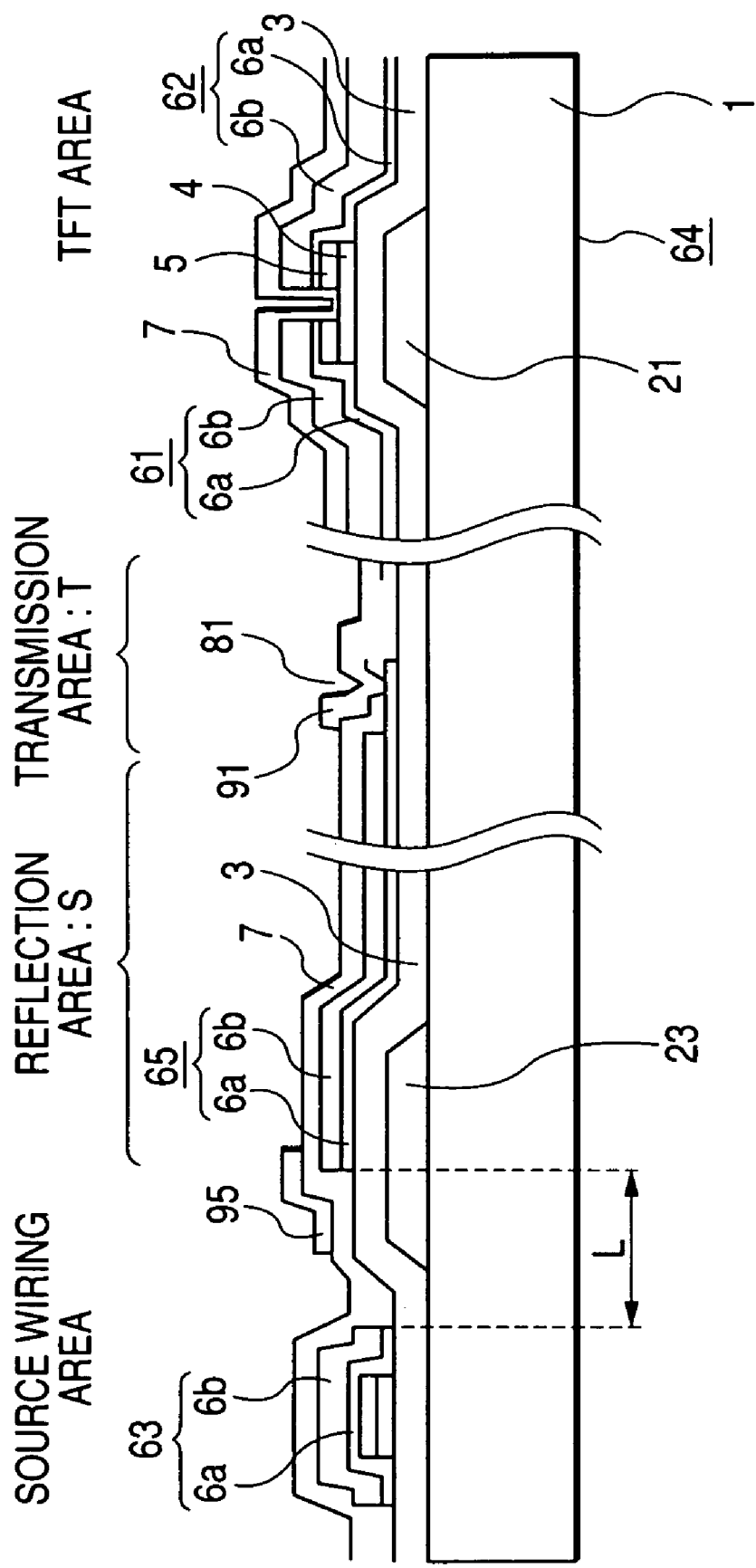

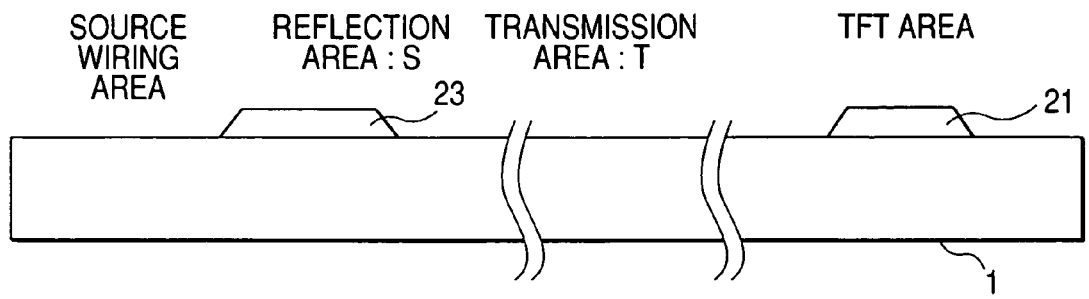
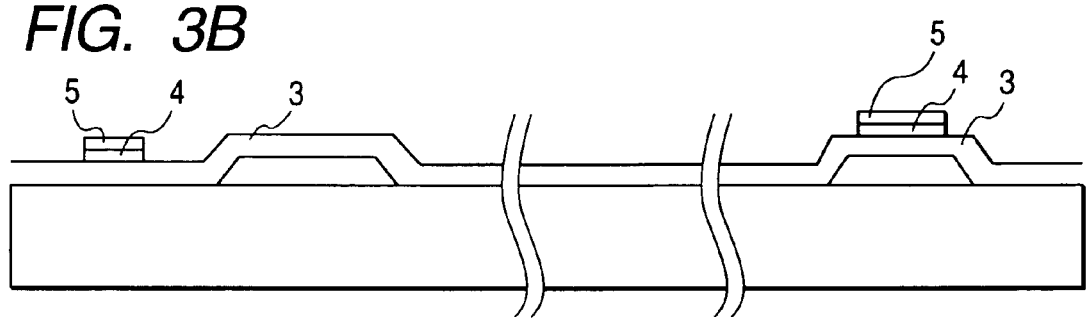
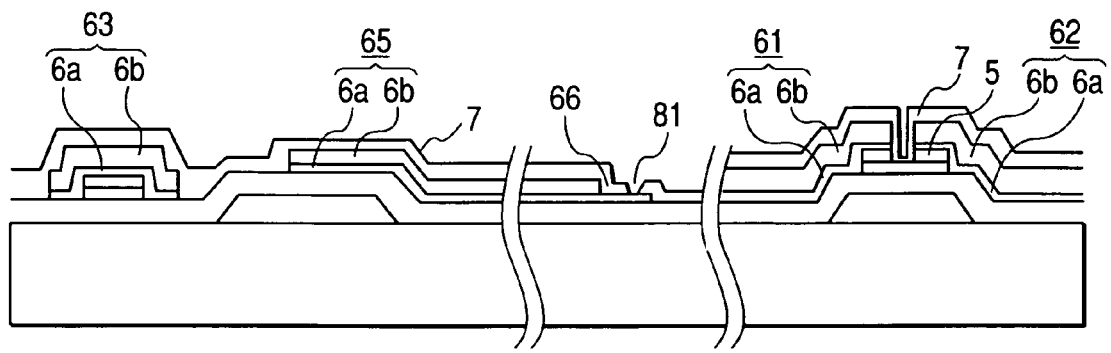
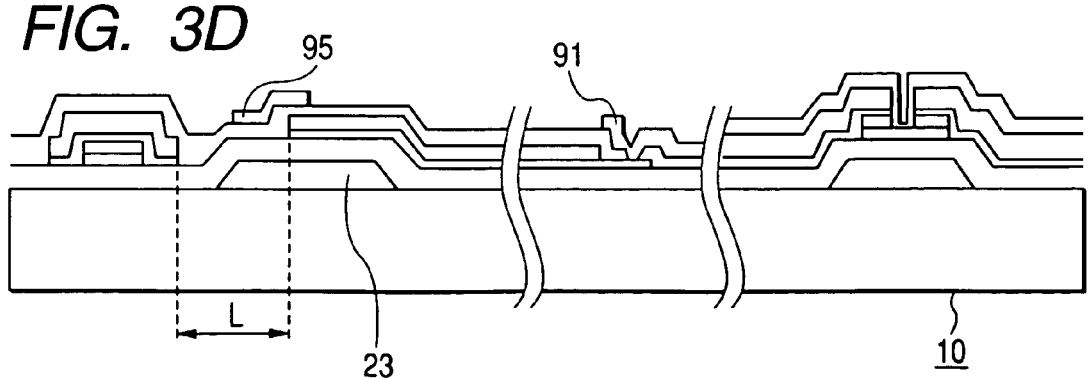

TRANSFLECTIVE LIQUID CRYSTAL DISPLAY DEVICE AND METHOD FOR MANUFACTURING THE SAME

BACKGROUND OF THE INVENTION

1. Field of the Invention

This invention relates to a liquid crystal display device of an active matrix type which is employed as a display device for images and characters such an office automation (OA) device, and more particularly to a transflective liquid crystal display device having a transmissive area which transmits light to a pixel area and a reflecting pixel electrode which reflects ambient light, and a method for manufacturing the transflective display device.

2. Description of the Related Art

Each of the pixels of a TFT (thin film transistor) array substrate which is employed for a conventional general transflective liquid crystal display device is provided with a transmissive area for transmitting light from a backlight provided behind a display face and a reflective area for reflecting ambient light incident on a liquid crystal layer.

In such a TFT array substrate for the transflective liquid display, a structure and a manufacturing method for simplifying a manufacturing process has been proposed in such a manner that a reflecting pixel electrode constituting the reflective area, a source wiring provided with a source electrode and a drain electrode are formed on the same layer (for example, see JP-A-2004-110299, pages 3 to 7, FIGS. 1 and 2).

In a transflective liquid crystal display device disclosed in JP-A-2004-110299 described below, as shown in FIGS. 1 and 2 of its publication, where a source wiring 63 and a reflecting pixel electrode 65 are formed on the same layer, in order to prevent the loss due to short-circuiting between the source wiring 63 and the reflecting pixel electrode 65, they must be formed with the interval therebetween being held. On the lowermost layer over this interval, a storage capacitive electrode and a storage capacitive wiring 24 are formed. Therefore, an opposite electrode (not shown) formed on an opposite substrate opposite to the TFT array substrate is opposite to the storage capacitive electrode and storage capacitive wiring 24.

However, in the structure of the TFT array substrate disclosed in JP-A-2004-110299, since the storage capacitive electrode and storage capacitive wiring 24 are at the same potential as the opposite electrode, an electric field is not applied to the liquid layer existing over the interval held. Thus, the light which is incident from the display face to reflect from the storage capacitive electrode and storage capacitive wiring 24 between the source wiring 63 and reflecting pixel electrode 65 cannot be restricted. This led to a problem of reducing reflecting contrast.

SUMMARY OF THE INVENTION

This invention has been accomplished in view of the above problem. An object of this invention is to provide a transflective liquid crystal display device with a source wiring and a reflecting pixel electrode formed on the same layer in which reflecting contrast is not reduced even when they are formed with an interval held therebetween.

According to an aspect of the present invention, a transflective liquid crystal display device in which a transmissive area to transmit light from a backlight to a pixel area and a reflective area to reflect externally incident ambient light as well as a thin film transistor to drive liquid crystal are arranged on an insulating substrate, the transflective liquid crystal display device includes a TFT array substrate and an opposite substrate. The TFT array substrate which includes a plurality of gate wirings each provided with a gate electrode made of a first conductive film which is formed on the insulating substrate, a storage capacitive wiring provided with a storage capacitive electrode made of the first conductive film, a plurality of source wirings each provided with a source electrode made of a second conductive film which crosses the gate wirings and is formed on the first conductive film through a first insulating film, a drain electrode made of the second conductive film, a reflecting pixel electrode which extends from the drain electrode to form the reflective area, and a transmissive pixel electrode forming the transmissive area which is formed on the second conductive film through a second insulating film. The opposite substrate is arranged oppositely to the TFT array substrate. The source wirings and the reflecting pixel electrode are arranged apart from each other by a predetermined interval, and a contrast preventing electrode is formed over the interval on the second insulating film.

In accordance with the configuration of the transflective liquid crystal display device according to this invention, because a contrast reduction preventing electrode is provided between the source wirings and the reflecting pixel electrode, a voltage is applied to the liquid crystal layer between the contrast reduction preventing electrode and the opposite electrode so that the light reflected from the storage capacitive electrode does not emit toward a display face, thereby giving a good display characteristic with high reflecting contrast.

BRIEF DESCRIPTION OF THE DRAWINGS

FIG. 2 is a sectional view of a TFT array substrate which constitutes the transflective liquid crystal display device according to the first embodiment of this invention;

FIGS. 3A to 3D are sectional views showing a manufacturing process flow of a TFT array substrate which constitutes the transflective liquid crystal display device according to the first embodiment of this invention;

DETAILED DESCRIPTION OF THE INVENTION

Now referring to the attached drawings, an explanation will be given of an embodiment of a TFT array substrate constituting a transflective liquid crystal display device according to this invention and a method for manufacturing this TFT array substrate. In respective figures, like reference symbols refer to like or substantially like configurations, thereby omitting the explanation therefor.

EMBODIMENT 1

Figure 1:
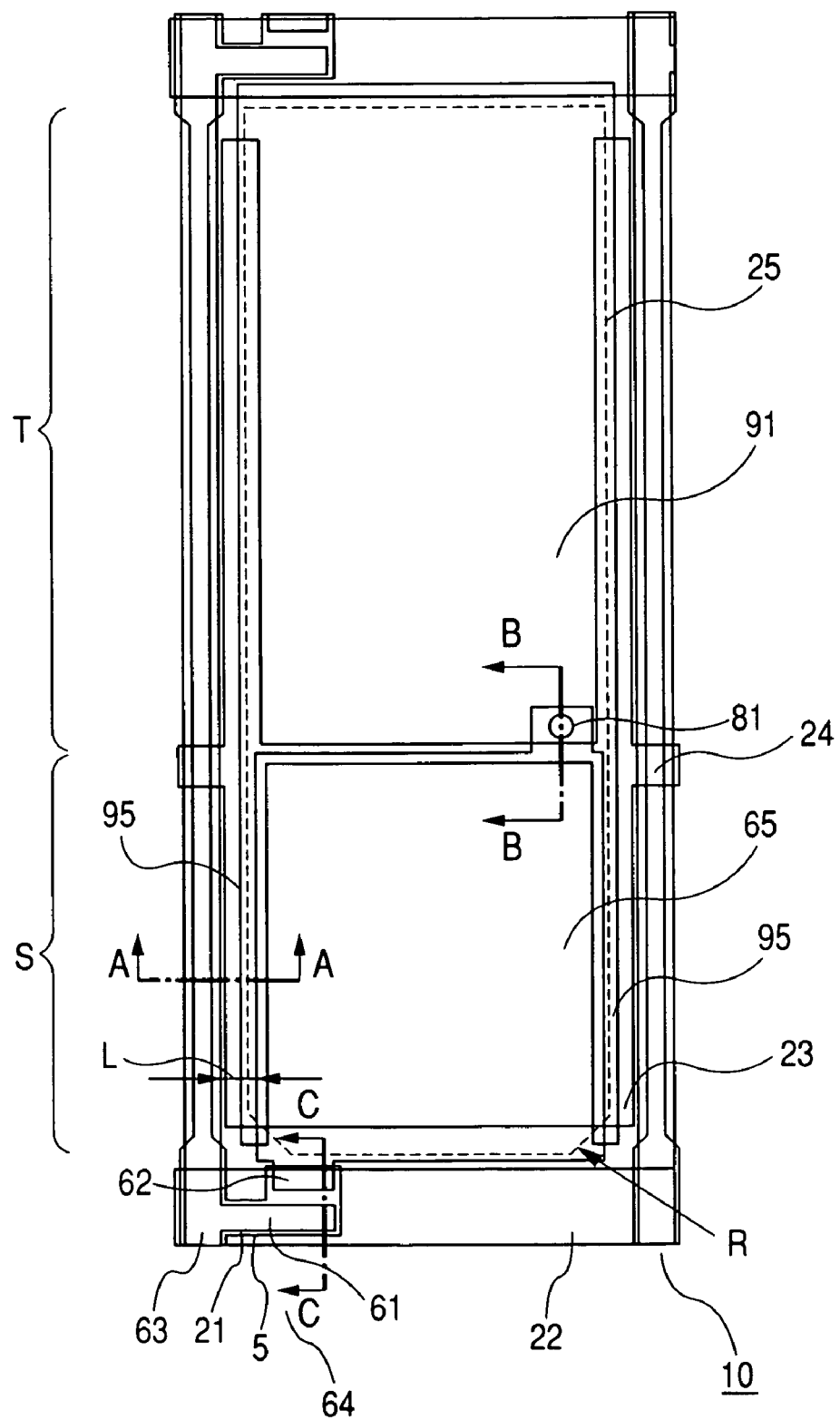
FIG. 1 is a plan view of a pixel on a TFT array substrate which constitutes the transflective liquid crystal display device according to the first embodiment of this invention.

FIG. 1 is a plan view showing the schematic configuration of the TFT array substrate according to this invention. FIG. 2 is a sectional view of the TFT array substrate shown in FIG. 1 when viewed from arrow line A-A (source wiring unit and reflective area: S), arrow line B-B (transmissive area: T) and arrow line C-C (TFT unit). FIGS. 3A to 3D are sectional views for explaining the method for manufacturing the TFT array substrate according to this invention. FIGS. 4A to 4D are plan views for explaining the method for manufacturing the TFT array substrate according to this invention.

In FIG. 1, each of the pixels formed on the TFT array substrate 10 is constructed of a transmissive area T which transmits light and a reflective area S which reflects ambient light incident on the liquid crystal layer.

In FIGS. 1 and 2, on a transparent insulating substrate 1 such as a glass substrate, formed are a gate wiring 22 provided with a gate electrode 21 of a first conductive film, and a storage capacitive wiring 24 provided with a first storage capacitive electrode 23 and a second storage capacitive electrode 25 for preventing light leakage from a backlight and hold a voltage during a predetermined period. A first insulating layer 3 is formed as an upper layer. On the gate electrode 21 formed are a semiconductive active layer 4 of a semiconductive layer and an ohmic contact film 5 through a first insulating film (gate insulating film) 3. The ohmic contact film 5 is removed at its center so as to be divided into two areas. A source electrode 61 of the second conductive film is stacked on the one area whereas a drain electrode 62 of the second conductive film is similarly stacked on the other area. These semiconductive active film 4 and the source electrode 61 and drain electrode 62 constitute a TFT 64 serving as a switching element.

A source wiring 63 extended from the source electrode 61 is provided to cross the gate wiring 22 through the first insulating film 3. In order to improve a withstand voltage, the semiconductive active film 4 and ohmic contact film 5 are left on this crossing region and source wiring 63.

The reflective area S is formed of the reflecting pixel electrode 65 extended from the drain electrode 62. Namely, the reflecting pixel electrode 65 is formed of the second conductive film. Therefore the second conductive film may be a thin film having a metallic film with high reflectivity formed on at least its surface layer. In order to prevent the defect due to short-circuiting between the reflecting pixel electrode 65 and source wiring 63, the reflecting pixel electrode 65 is arranged apart from the source wiring 63 by a predetermined interval L (preferably, about 5 μm to 10 μm).

A second insulating film 7 is formed to cover the constituent elements described above. A part of the second insulating film on the reflecting pixel electrode 65 is removed to form a contact hole 81. As its upper layer, a transmissive pixel electrode 91 of a conductive film (hereinafter referred to as a transparent conductive film) is formed to form the transmissive area T. The transmissive pixel electrode 91 is electrically connected to the reflecting pixel electrode 65 through the contact hole 81 and further electrically connected to the drain electrode 62 through the reflecting pixel electrode 65. Over the interval L between the reflecting pixel electrode 65 and source wiring 63, a contrast reduction preventing electrode 95 of a transparent conductive film is arranged through the second insulating film 7. In this embodiment, the contrast reduction preventing electrode 95 is formed in approximately parallel to the source wiring 63 so that the former extends along the latter.

Now referring to FIGS. 3A to 4D, an explanation will be given of a process for manufacturing the transflective liquid crystal display device according to the first embodiment.

Figure 4A:
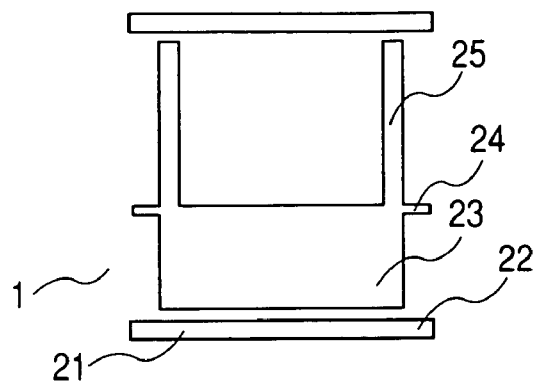
FIGS. 4A to 4D are plan views showing a manufacturing process flow of a TFT array substrate which constitutes the transflective liquid crystal display device according to the first embodiment of this invention.

First, as seen from FIG. 3A and FIG. 4A, a transparent insulating substrate 1 such as a glass substrate is washed to clean its surface. Thereafter, a first conductive film is deposited on the transparent insulating substrate 1 by e.g. sputtering and further patterned. The first conductive film may be a thin film of e.g. chromium (Cr), molybdenum (Mo), tantalum (Ta), titanium (Ti), aluminum (Al) or an alloy containing these materials as a main component. In this embodiment, the chromium film having a thickness of 400 nm is formed as the first conductive film.

Incidentally, on the first conductive film, a contact hole 81 will be formed in a step described below by dry etching. And within the contact hole 81, a conductive thin film (transparent conductive film) for making an electric contact is formed. For this reason, the first conductive film is preferably a metallic film that is difficult to cause surface oxidation or has conductivity when it is oxidized. Further, where an Al-series material is used as the first conductive film, in order to prevent deterioration in the conductivity due to the surface oxidation, an Al nitride film or a film of Cr, Mo, Ta or Ti may be formed on the surface.

Next, the first conductive film is patterned by a first photolithography step to form a gate electrode 21, a gate wiring 22, a first storage capacitive electrode 23 and storage capacitive wiring 24, and a second storage capacitive electrode 25. The first storage capacitive electrode 23 is formed on the nearly entire surface of the reflective area S. The second storage capacitive electrode 25 is formed along a source wiring 63 described later. In the photolithography, after the substrate is washed, photoresist is applied and dried. Thereafter, light exposure and development is done through a mask with a prescribed mask pattern formed. Thus, the photoresist with the mask pattern duplicated on the substrate is formed. After the photoresist is heated and hardened, the first conductive film is etched and thereafter the photoresist is removed.

Incidentally, the first conductive film is etched by wet etching using a known etchant. For example, where the first conductive film is made of Cr, a water solution of a mixture of cerium/ammonium nitrate and nitric acid is employed. In the etching of the first conductive film, in order to improve the coverage of the insulating film at the step of a pattern edge thereby to prevent short-circuiting with the other wirings, taper etching is preferably done so as to provide a trapezoidal taper shape in a pattern edge section.

Figure 4B:
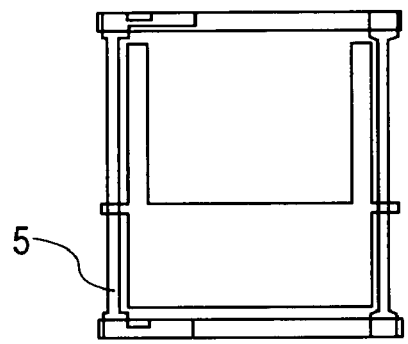

Next, as shown in FIGS. 3B and 4B, a first insulating film 3, a semiconductive active film 4 and an ohmic contact film 5 are successively deposited by plasma CVD, and thereafter patterned. The first insulating film 3 serving as a gate insulating film may be a single-layer film of an SiNx film, an SiOy film, an SiOzNw film, or a multiple-layer film of these films stacked (Incidentally, x, y, z and w each are positive numbers representing stoichiometry). If the first insulating film 3 is thin, short-circuiting is likely to occur at the crossing portion of the gate wiring 22 and source wiring 63. And if the first insulating film 3 is thick, the ON current of the TFT decreases to deteriorate the display characteristic. For this reason, the first insulating film 3 is thicker than the first conductive film but is preferably as thin as possible. Further, in order to prevent the inter-layer short-circuiting due to occurrence of pin holes, the first insulating film 3 is preferably deposited divisionally in a plurality of numbers of times. In this embodiment, after an SiN film having a thickness of 300 nm is deposited, another SiN film having a thickness of 100 nm is deposited thereby forming an SiN film having a thickness of 400 nm as the first insulating film 3.

The semiconductive active film 4 may be an amorphous silicon (a-Si) film, a polysilicon (p-Si) film, etc. As regards the film thickness of the semiconductive active film 4, if it is thin, film disappearance occurs during the dry etching of the ohmic contact film 5 described later, and if it is thick, the ON current of the TFT decreases. For this reason, the thickness of the film thickness of the semiconductive active film is selected taking into consideration the controllability of the etching amount during the dry etching of the ohmic contact film 5 and the required ON current of the TFT. In this embodiment, the a-Si film having a thickness of 150 nm is deposited as the semiconductive active film 4.

The ohmic contact film 5 may be an n-type a-Si film in which the a-Si is doped with a very small quantity of phosphorus (P), or a n-type p-Si film. In this embodiment, the n-type a-Si film having a thickness of 30 nm is deposited as the ohmic contact film 5.

In a second photolithography step, the semiconductive active film 4 and ohmic contact film 5 are patterned so that they are left in at least a portion where the TFT unit is formed. Additionally, if the semiconductive active film 4 and ohmic contact film 5 are also left at the portion where the gate wiring 22 and source wiring 63 cross each other and the portion where the source wiring 63 is formed as well as the portion where the TFT unit is formed, the withstand voltage can be increased. Incidentally, the semiconductive active film 4 and ohmic contact film 5 can be etched by dry etching using a known gas composition (for example, mixed gas of $SF_6$ and $O_2$, or mixed gas of $CF_4$ and $O_2$).

Figure 4C:
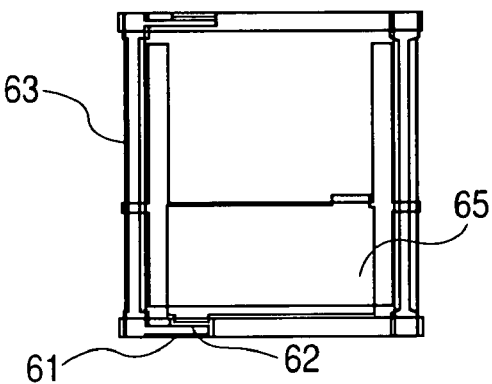

Next, as shown in FIG. 3C and FIG. 4C, a second conductive film is deposited by e.g. sputtering and thereafter patterned. The second conductive film is formed of a thin film composed of a first layer 6a of e.g. Cr, Mo, Ta, Ti or an alloy containing these metals as a main component and a second layer 6b of Al, silver (Ag) or an alloy containing these metals as a main component. The first layer 6a is deposited, in direct contact, on the ohmic contact layer 5 and first insulating layer 3. The second layer 6b is superposedly deposited, in direct contact, on the first layer 6a. The second conductive film, which are used as the source wiring 63 and the reflecting pixel electrode 65, must be constructed considering the wiring resistance and reflecting characteristic of the surface layer. In this embodiment, a Cr film having a thickness of 100 nm is deposited as the first layer 6a of the second conductive film and an AlCu film having a thickness of 300 nm is deposited as the second layer 6b thereof.

Next, in a third photolithography, the second conductive film is patterned to form the source wiring 63 provided with the source electrode 61 and the reflecting pixel electrode 65 provided with the drain electrode 62. The drain electrode 62 and the reflecting pixel electrode 65 are continuously formed in the same layer so that they are electrically connected to each other in the same layer. The second conductive film can be etched by wet etching using a known etchant.

Subsequently, the central portion of the ohmic contact film 5 of the TFT unit is etched away to expose the semiconductive active film 4. The ohmic contact film 5 can be etched by dry etching using a known gas composition (for example, a mixed gas of $SF_6$ and $O_2$, or mixed gas of $CF_4$ and $O_2$).

The second layer 6b of AlCu at the portion where a contact hole 81 is formed is removed to form a contact area 66. In order that the photoresist at the removed portion can be finished thin, during the third photolithography step, the photoresist is subjected to light exposure such as half-tone exposure, and after the dry etching of the ohmic contact film 5, the photoresist is subjected to film thickness reducing processing using e.g. oxygen plasma to remove only the photoresist at the removed portion, and the AlCu film is wet-etched, thereby forming the contact area 66. Thus, the surface of the second conductive film in contact with the transparent conductive film is made of Cr of the first layer 6a, thereby making a contact with good conductivity.

An explanation will be given of the process of the halftone exposure. In the halftone exposure, by the light exposure through a halftone mask, e.g. the mask having light and shade in a Cr pattern, the intensity of the light exposure is adjusted to control the remaining film thickness of the photoresist. Thereafter, first, the film at the area with the photoresist removed is etched. Next, the photoresist is subjected to the film thickness reduction processing using e.g. oxygen plasma to remove the photoresist at the area with a small remaining film thickness. Further, the film with the small remaining film thickness of the photoresist (the photoresist has been removed) is etched. Thus, the patterning corresponding to two steps can be carried out by the single photolithography step.

Where e.g. aluminum nitride alloy (AlCuN) is formed on the surface of the second conductive film, the reflectivity is slightly reduced. But a good contact with the transparent conductive film 91 described below is given so that the step of forming the contact area 66 can be omitted.

Next, a second insulating film 7 is deposited by e.g. plasma CVD. The second insulating film 7 can be formed of the same substance as the first insulating film 3. The film thickness of the second insulating film is preferably determined considering the coverage for an underlying pattern. In this embodiment, an SiN film having a thickness of 500 nm is deposited as the second insulating film 7.

Next, in a fourth photolithography step, the second insulating film 7 is patterned to form the contact hole 81 on the reflecting pixel electrode 65. The second insulating film 7 is etched by wet etching using a know etchant, or dry etching using a known gas composition.

Figure 4D:
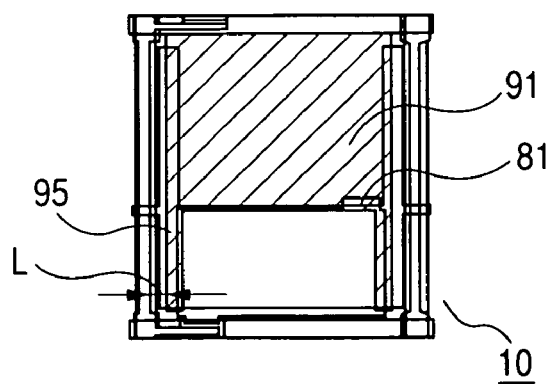

Next, as shown in FIG. 3D and FIG. 4D, a transparent conductive film is deposited by sputtering and thereafter patterned. The transparent conductive film may be made of e.g. ITO or $SnO_2$, and is preferably made of ITO from the viewpoint of chemical stability. Incidentally, although ITO may be either crystalline ITO or amorphous ITO (a-ITO), where the a-ITO is used, after patterned, it must be crystallized by heating at the crystallizing temperature of 180° C. or higher. In this embodiment, an a-ITO film having a thickness of 80 nm is deposited as the transparent conductive film.

Next, in a fifth photolithography step, the transparent conductive film is patterned to form the transmissive pixel electrode 91 in the transmissive area T. Considering displacements during patterning, at the boundary between the reflective area S and the transmissive area T, the transmissive pixel electrode 91 is formed to partially overlap the reflecting pixel electrode 65 through the second insulating film 7. The transparent conductive film is not formed in the reflective area S other than the boundary, thereby preventing reduction in the reflectivity. The reduction in the voltage between the transparent conductive film and the first insulating film 3 and second insulating film 7 is prevented so that the voltages at the transmissive pixel electrode 91 and the reflecting pixel electrode 65 can be placed at substantially the same potential. The side wall of the contact hole 81 which corresponds to the connecting portion between the reflecting pixel electrode 65 and the transmissive pixel electrode 91 is covered with the transparent conductive film.

In this embodiment, over the interval between the reflecting pixel electrode 65 and source wiring 63, the contrast reduction preventing electrode 95 for preventing reduction in the reflecting contrast is formed of a transparent conductive film through the second insulating film 7. The contrast reduction preventing electrode 95 is formed along the source wiring 63 and nearly in parallel to the source wiring 63 at the position overlapping the first storage capacitive electrode 23. As shown in FIG. 1, the contrast reduction preventing electrode 95 is formed at least from the end of the reflecting pixel electrode formed oppositely to the above source wiring to the position corresponding to the boundary R where the black matrix is arranged on an opposite substrate (described later) arranged oppositely to the TFT array substrate. The contrast reduction preventing electrode 95 may be formed at the position overlapping a part of the reflecting pixel electrode 65 through the first insulating film 3 and second insulating film 7. Incidentally, by forming the contrast reduction preventing electrode 95 so as to extend from the transmissive pixel electrode 91, its manufacturing step can be simplified.

The TFT array substrate 10 manufactured in the process described above is coated with an aligning film in the subsequent cell forming step to perform rubbing processing in a predetermined direction. Likewise, the opposite substrate (not shown) opposite to the TFT array substrate is provided with the black matrix which encircles the pixel area on another transparent insulating substrate. A color filter is formed on this encircled area. As layers overlying the color filter, a protection film, an opposite transparent electrode, etc. are stacked, and coated with the aligning film to perform the rubbing processing. These TFT array substrate 10 and opposite substrate are superposed through a spacer so that their aligning films face each other. With their substrate edges bonded by a sealing member, liquid crystal is sealed in between both substrates. Polarized plates are bonded on both surfaces of the liquid crystal cells thus formed and a backlight is attached behind them, thereby completing the transflective liquid crystal display device.

Incidentally, on the opposite substrate, at its portion opposite to the reflective area S of the TFT array substrate, a transparent organic film is formed so that the thickness of the liquid crystal layer in the reflective area S can be smaller than that in the transmissive area T. This facilitates to match the electrooptic characteristics in reflection and transmission.

Figure 5:
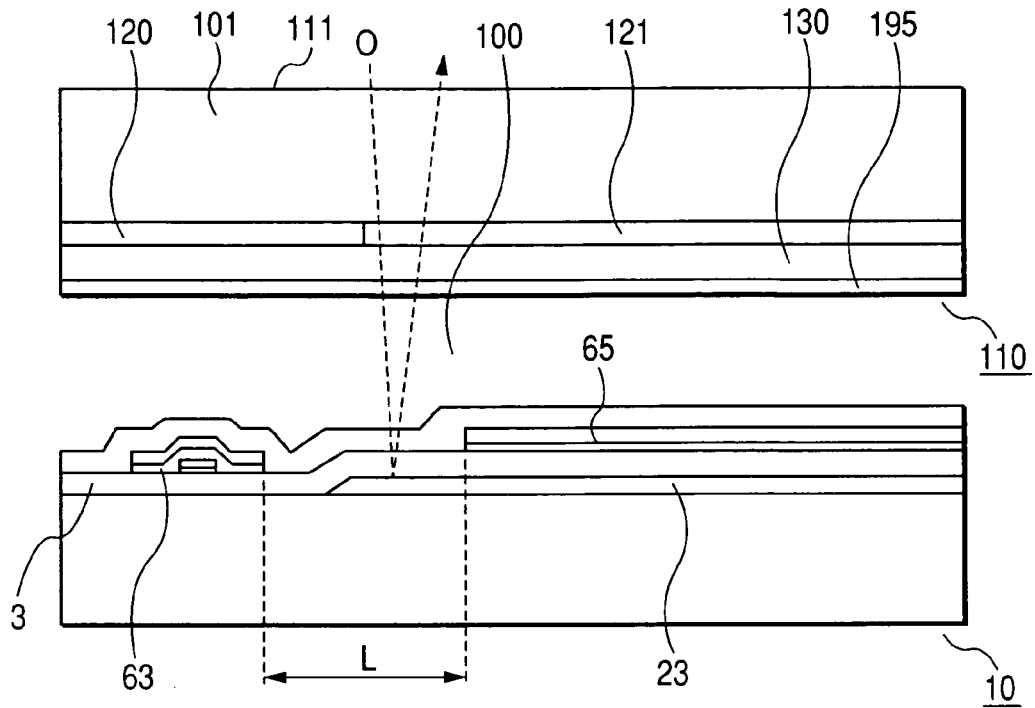
FIG. 5 is a sectional view of an TFT array substrate and an opposite substrate which constitutes a conventional transflective liquid crystal display device.
Figure 6:
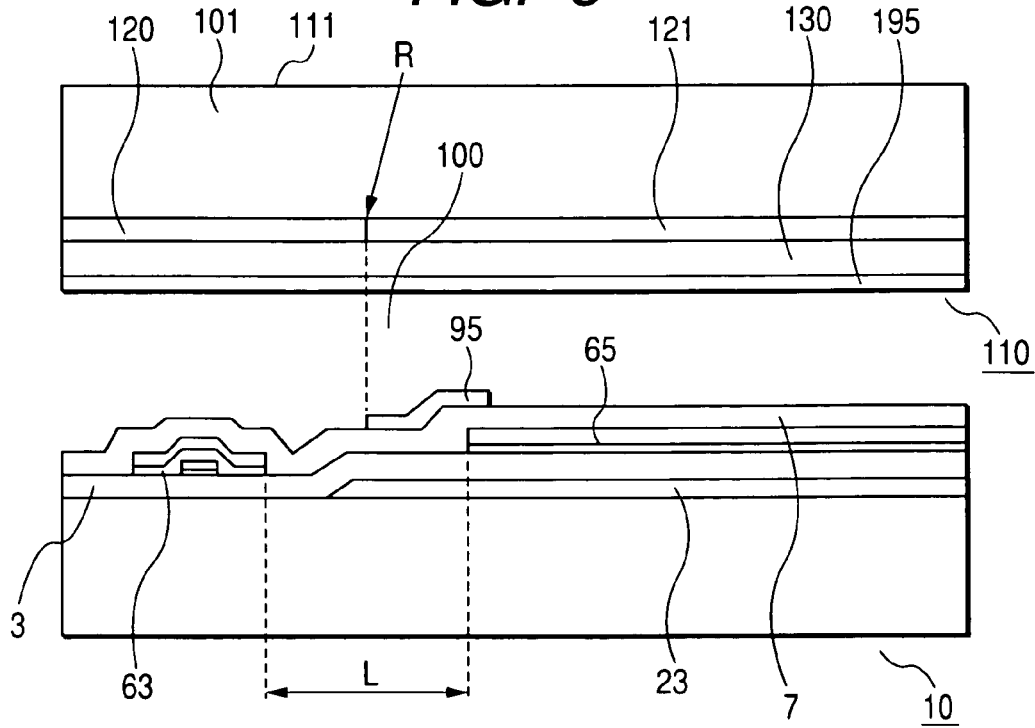
FIG. 6 is a sectional view of an TFT array substrate and an opposite substrate which constitutes a transflective liquid crystal display device according to a first embodiment of this invention.

FIG. 5 is sectional views of a conventional TFT array substrate and an opposite substrate opposite to this TFT array substrate. FIG. 6 is sectional views of the TFT array substrate shown in FIG. 1 taken in arrow line A-A and the opposite substrate opposite to this TFT array substrate.

Referring to FIGS. 5 and 6, the operation of this invention will be explained. In FIGS. 5 and 6, an opposite substrate 110 arranged oppositely to a TFT array substrate 10 includes a black matrix 120 for light shielding, a color filter 121, an overcoat layer 130 and an opposite transparent electrode 195, which are successively formed on an opposite transparent insulating substrate 101.

As shown in FIG. 5, when an electric field is applied in a general normally-white mode (which gives white display with no electric field applied) adopted in a conventional transflective liquid crystal display device, the storage capacitive electrode 23 formed at the interval between the source wiring 63 and the reflecting pixel electrode 65 and the opposite electrode 195 on the opposite electrode substrate 110 are placed at nearly equal potentials. So no electric field is applied to the liquid crystal layer 100 in this area, thus always making the white display.

Therefore, the light incident from a display face 111 (ambient light incident face) indicated by D in FIG. 5 reflects from the storage capacitive electrode 23 and emits toward the display face 111 again. This causes the reduction in the reflecting contrast. In this invention, as shown in FIG. 6, the contrast reduction preventing electrode 95 is formed, through the first insulating film 3 and second insulating film 7, over the interval L between the source wiring 63 and the reflecting pixel electrode 65 at least from the end of the reflecting pixel electrode formed oppositely to the source wiring to the position corresponding to the boundary R where the black matrix is arranged on an opposite substrate. For this reason, the electric field is applied to the liquid crystal layer 100 between the contrast reduction preventing electrode 95 and the opposite electrode 195. Thus, the reflecting light from the storage capacitive electrode 23 over the interval L does not emit toward the display face 111, thereby providing an improved display characteristic with high reflecting contrast.

As described hitherto, in the transflective display device according to this invention, because the contrast reduction preventing electrode 95 is provided at the interval between the source wiring 63 and the reflecting pixel electrode 65, the electric field is applied to the liquid crystal layer 100 between the contrast reduction preventing electrode 95 and the opposite electrode 195 so that the reflecting light from the storage capacitive electrode 23 does not emit toward the display face 111, thereby providing an improved display characteristic with high reflecting contrast.

The contrast reduction preventing electrode 95 may be formed in the manufacturing step or by the material different from that for the transmissive pixel electrode 91 as long as the contrast reduction preventing electrode 95 is electrically connected to the transmissive pixel electrode 91 and the electric field is applied between the contrast reduction preventing electrode 95 and the opposite electrode 195. As in this embodiment, by forming the contrast reduction preventing electrode 95 so as to extend from the transmissive pixel electrode 91, it can be made without increasing the number of manufacturing steps.

Figure 7:
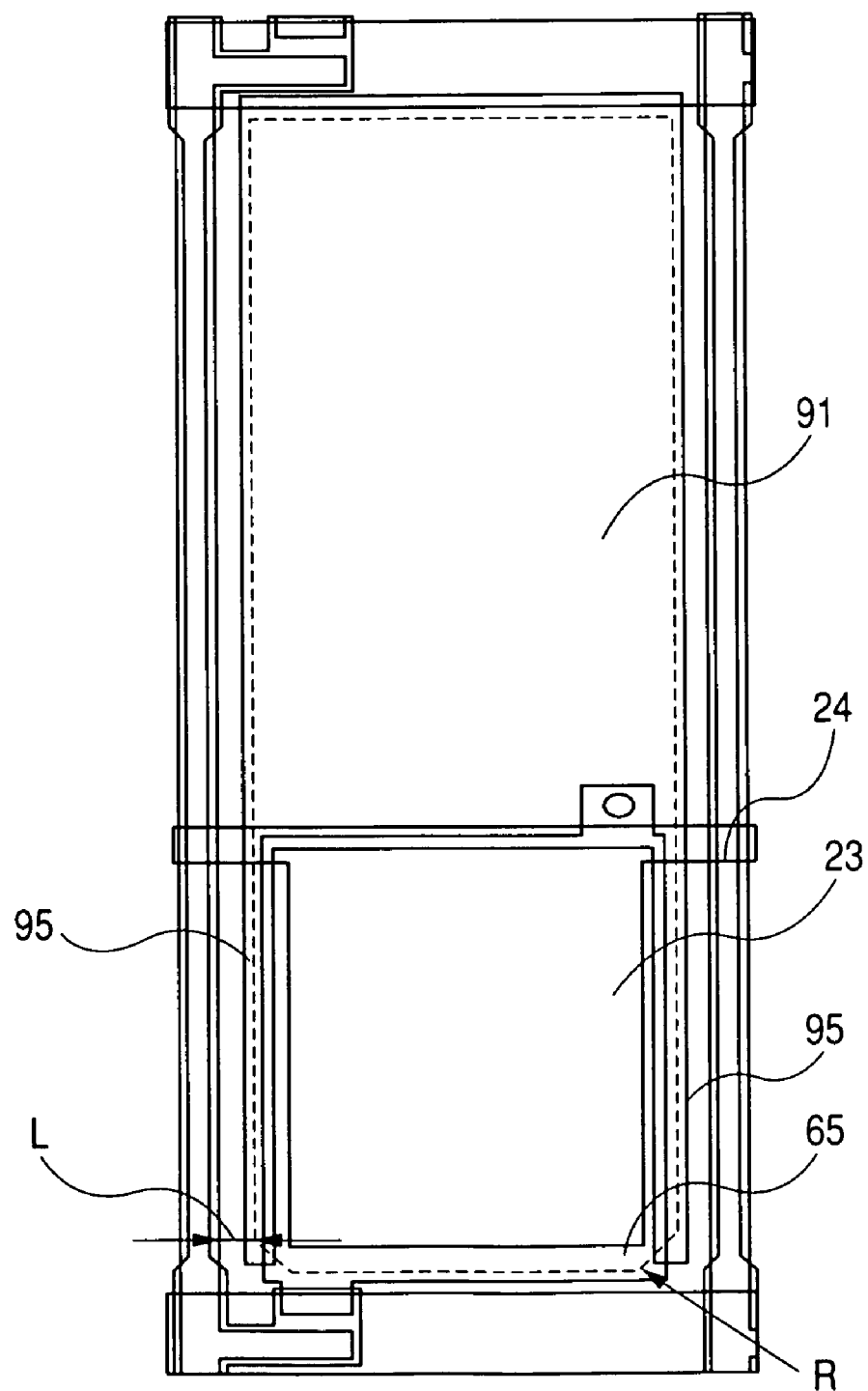
FIG. 7 is a plan view of a pixel of the TFT array which constitutes a transflective liquid crystal display device according to the first embodiment of this invention.

FIG. 7 is a view showing a modification of the above embodiment. As seen from the plan view of FIG. 7, in this modification, the reflecting pixel electrode 65 is formed at the position overlapping the storage capacitive electrode 23 through the first insulating film 3. At the interval L, the contrast reduction preventing electrode 95 is formed through the second insulating film 7. The remaining configuration is the same as those in FIGS. 1 and 2.

In this modification, the reflecting pixel electrode 65 is formed at the position overlapping the storage capacitive electrode 23 through the first insulating film 3, and the contrast reduction preventing electrode 95 is formed at the interval L between the source wiring 63 and reflecting pixel electrode 65. Therefore the electric field is applied between the contrast reduction preventing electrode 95 and the opposite electrode so that light from the backlight over the interval L is prevented from emitting toward the display face, thereby giving the improved display characteristic with high reflection and transmission contrast. Further, the capacitance between the source wiring 63 and the first storage capacitive electrode 23 can be reduced so that reduction in power consumption can be realized.

Figure 8:
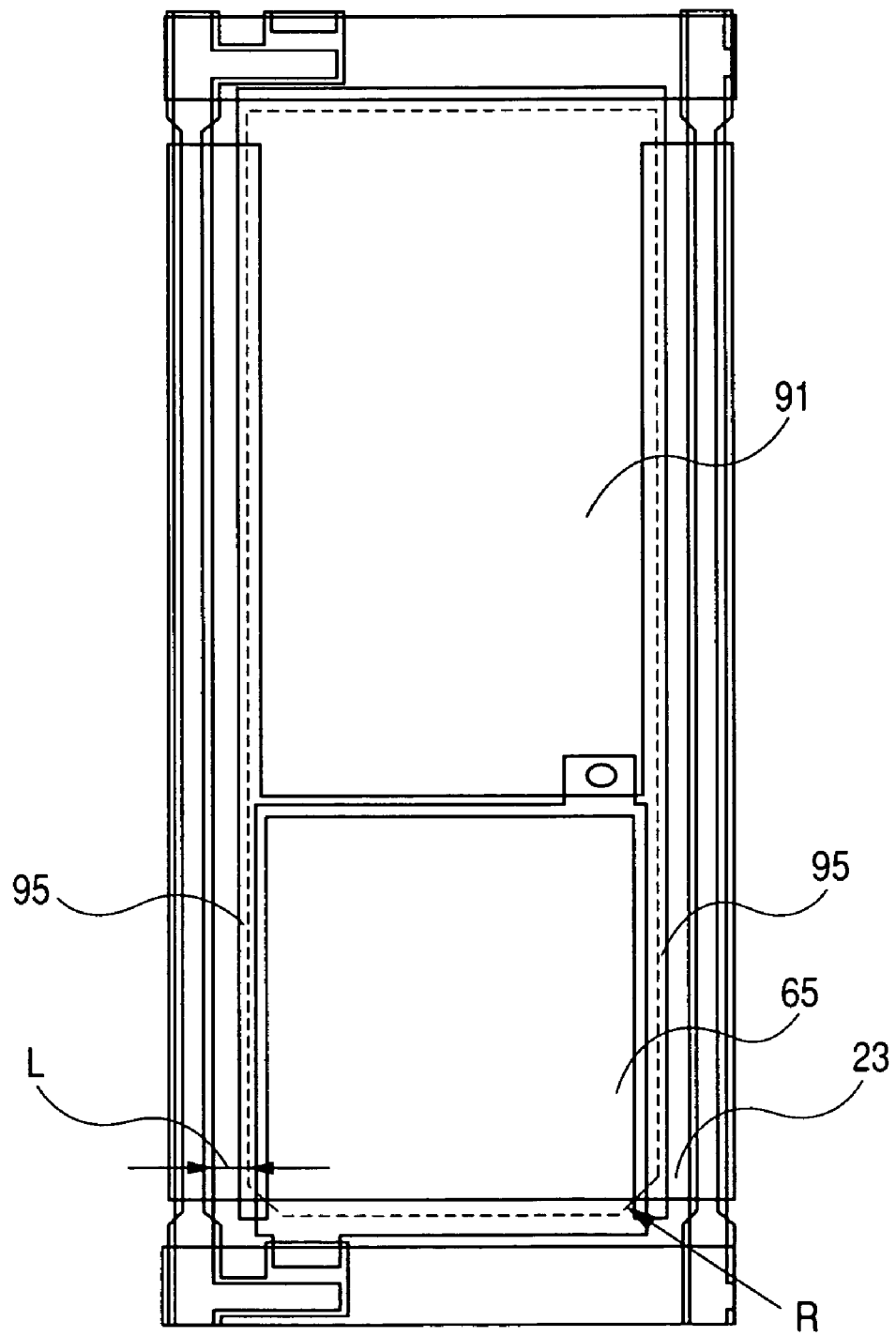
FIG. 8 is a plan view of a pixel of the TFT array which constitutes a transflective liquid crystal display device according to the first embodiment of this invention.

FIG. 8 is a view showing another modification of the above embodiment. As seen from the plan view of FIG. 8, in this modification, the storage capacitive electrode 23 is formed so as to extend to beneath the source wiring 63. At the interval L, the contrast reduction preventing electrode 95 is formed through the second insulating film 7. The remaining configuration is the same as those in FIGS. 1 and 2.

In this modification, the storage capacitive electrode 23 is formed so as to extend to beneath the source wiring 63, and at the interval L between the source wiring 63 and the reflecting pixel electrode 65, the contrast reduction preventing electrode 95 is formed through the second insulating film 7 so that the electric field is applied to the liquid crystal layer between the contrast reduction preventing electrode 95 and the opposite electrode. Therefore the light of the backlight from the interval L does not emit toward the display face, thereby giving the improved display characteristic with high reflection and transmission contrast. By forming the storage capacitive electrode 23 so as to extend to beneath the source wiring 63 and extending the contrast reduction preventing electrode 95, the area where the black matrix is arranged to encircle a pixel area can be reduced, thereby improving a pixel aperture ratio.

What is claimed is:

1. A transflective liquid crystal display device in which a transmissive area to transmit light from a backlight to a pixel area and a reflective area to reflect externally incident ambient light as well as a thin film transistor to drive liquid crystal are arranged on an insulating substrate, comprising:
    an TFT array substrate which includes:
    a plurality of gate wirings each provided with a gate electrode made of a first conductive film which is formed on the insulating substrate;
    a storage capacitive wiring provided with a storage capacitive electrode made of the first conductive film;
    a plurality of source wirings each provided with a source electrode made of a second conductive film which crosses the gate wirings and is formed on the first conductive film through a first insulating film;
    a drain electrode made of the second conductive film
    a reflecting pixel electrode made of the second conductive film and extending from the drain electrode to form the reflective area, the drain electrode and the reflecting pixel electrode being formed in the same layer and electrically connected to each other;
    a transmissive pixel electrode forming the transmissive area which is formed on the second conductive film through a second insulating film; and
    an opposite substrate which is arranged oppositely to the TFT array substrate;
    wherein the source wirings and the reflecting pixel electrode are arranged apart from each other by a predetermined interval, and the storage capacitive electrode extends from a portion below the reflecting pixel electrode to a portion below the interval; and
    a contrast reduction preventing electrode is formed over the interval on the second insulating film, and at least a part of the contrast reduction preventing electrode being located above the storage capacitive electrode.

2. The transflective liquid crystal display device according to claim 1, wherein
    the contrast reduction preventing electrode is formed to extend at least from an end of the reflecting pixel electrode formed oppositely to each the source wirings to the position corresponding to a boundary where a black matrix is arranged on the opposite substrate.

3. The transflective liquid crystal display device according to claim 1, wherein
    the contrast reduction preventing electrode and the transmissive electrode are made of the same material.

4. The transflective liquid crystal display device according to claim 1, wherein
    the contrast reduction preventing electrode is formed to extend from the transmissive pixel electrode.

5. A method for manufacturing a transflective liquid crystal display device in which a transmissive area to transmit light from a backlight to a pixel area and a reflective area to reflect externally incident ambient light as well as a thin film transistor to drive liquid crystal are arranged on an insulating substrate, the method comprising:
    forming a plurality of gate wirings each provided with a gate electrode made of a first conductive film which is formed on the insulating substrate;
    forming a storage capacitive wiring provided with a storage capacitive electrode made of the first conductive film
    forming a plurality of source wirings each provided with a source electrode made of a second conductive film which crosses the gate wirings and is formed on the first conductive film through a first insulating film;
    forming a drain electrode made of the second conductive film
    forming a reflecting pixel electrode made of the second conductive film extending from the drain electrode to form the reflective area, the drain electrode and the reflecting pixel electrode being formed in the same layer and electrically connected to each other;
    forming a transmissive pixel electrode on the transmissive area on the second conductive film through a second insulating film;
    arranging the source wirings and the reflecting pixel electrode apart from each other by a redetermined interval wherein the storage capacitive electrode extends from a portion below the reflecting pixel electrode to a portion below the interval; and
    forming a contrast reduction preventing electrode over the interval on the second insulating film, at least a part of the contrast reduction preventing electrode being located above the storage capacitive electrode.

6. A method for manufacturing a transflective liquid crystal display device according to claim 5, wherein
    the forming the contrast reduction preventing electrode is the same as the forming the transmissive pixel electrode.

* * * * *